US010743475B2

(12) United States Patent
Friesen (10) Patent No.: US 10,743,475 B2
(45) Date of Patent: Aug. 18, 2020

(54) AGRICULTURAL WAGON WITH UNLOAD AUGER OPERABLE ON BOTH SIDES

(71) Applicant: Elmer's Welding & Manufacturing Ltd., Altona (CA)

(72) Inventor: Michael Ian James Friesen, Altona (CA)

(73) Assignee: Elmer's Welding & Manufacturing Ltd., Altona (CA)

(*) Notice: Subject to any disclaimer, the term of this patent is extended or adjusted under 35 U.S.C. 154(b) by 121 days.

(21) Appl. No.: 16/007,136

(22) Filed: Jun. 13, 2018

(65) Prior Publication Data

US 2019/0000016 A1  Jan. 3, 2019

Related U.S. Application Data

(60) Provisional application No. 62/526,667, filed on Jun. 29, 2017.

(51) Int. Cl.
*A01D 90/14* (2006.01)
*B60P 1/42* (2006.01)
*F16H 1/22* (2006.01)

(52) U.S. Cl.
CPC ........... *A01D 90/14* (2013.01); *B60P 1/42* (2013.01); *F16H 1/222* (2013.01)

(58) Field of Classification Search
CPC . A01D 90/10; A01D 90/14; B60P 1/40; B60P 1/42; B65G 65/46; B65G 65/466; B65G 67/24; F16H 1/222
USPC .............. 414/523, 525.1, 526, 416.01, 332
See application file for complete search history.

(56) References Cited

U.S. PATENT DOCUMENTS

| | | | | | |
|---|---|---|---|---|---|
| 2,622,453 | A | * | 12/1952 | Garnier | F16H 1/222 74/665 S |
| 2,654,267 | A | * | 10/1953 | Schmitter | F16H 1/222 74/665 S |
| 2,839,208 | A | * | 6/1958 | Hansen | B60P 1/40 414/505 |
| 3,844,433 | A | * | 10/1974 | Laajala | B60P 1/42 414/505 |
| 5,468,113 | A | * | 11/1995 | Davis | B60P 1/40 198/550.1 |
| 6,776,569 | B1 | * | 8/2004 | McMahon | B60P 1/40 198/666 |
| 2011/0164952 | A1 | * | 7/2011 | Hollenberg | B60P 1/42 414/523 |

* cited by examiner

*Primary Examiner* — Glenn F Myers
(74) *Attorney, Agent, or Firm* — Ryan W. Dupuis; Ade & Company Inc.; Kyle R. Satterthwaite (57) ABSTRACT

An agricultural wagon, for example a grain cart, of the type including an upright unload auger at the front end of the grain receiving bin which can be pivoted between left side and right side discharge positions, further includes a gearbox supported at the bottom end of the unload auger. The gearbox has a main shaft directly coupled to the unload auger. An input shaft of the gearbox, coupled to the main shaft by gear reducing bevel gears, receives an input rotation from a drive source external of the gearbox, for example the PTO of a tractor, for driving the main shaft and the unload auger. A second pair of bevel gears transfer some of the input rotation of the main shaft to an output shaft of the gearbox which is connected to a lower auger along the bottom of the grain receiving bin.

16 Claims, 10 Drawing Sheets

AGRICULTURAL WAGON WITH UNLOAD AUGER OPERABLE ON BOTH SIDES

This application claims the benefit under 35 U.S.C.119(e) of U.S. provisional application Ser. No. 62/526,667, filed Jun. 29, 2017.

FIELD OF THE INVENTION

The present invention relates to an agricultural wagon, for example a grain cart, including an unload auger at one end of the wagon for unloading material from the wagon and a lower auger for moving material in the wagon towards the unload auger; and more particularly the present invention relates to an agricultural wagon including a gearbox at a junction of the unload auger and the lower auger for directly driving the unload auger and the lower auger from a drive rotation input into a single input shaft of the gearbox.

BACKGROUND

Grain carts are commonly used in agriculture to aid in the harvesting of various agricultural crops including grain, corn, beans or other crops generally referred to herein as particulate material. A grain cart typically comprises a storage bin supported on wheels for towing behind a towing vehicle, for example a tractor, having a power takeoff shaft. An unload auger is typically located at one end of the storage bin to discharge material from the bin upwardly and to one side of the bin. A lower auger is commonly located within the bottom of the bin to move particulate material in the bin towards the bottom end of the unload auger. Examples of grain carts of this type can be found in US patent application publications US 2011/0164952 by Hollenberg and US 2015/0203019 by Kinzenbaw. As best shown in Hollenberg, one prior art means of driving rotation of the augers is to provide a driveshaft extending the length of the grain cart from the power takeoff shaft in front of the grain cart to a transfer case at the rear of the grain cart to drive the lower auger from the rear end thereof. The drive can be transferred from the lower auger to the unload auger by a separate drive connection between a singular input connected to the lower auger and a singular output connected to the unload auger. Use of a driveshaft extending the length of the grain cart can interfere with ground clearance, and thus requires the bottom end of the storage bin locating the lower auger therein to be raised a considerable distance from the ground to accommodate the driveshaft, resulting in poor stability of the overall grain cart.

Alternatively, in a more traditional dual auger system, the horizontal auger sits slightly above the vertical auger axis pushing the grain from the tank and dropping it onto the vertical auger inside a transition housing. The drive system for the dual auger system consists of a drive shaft that drives a right-angle gearbox to drive the vertical flighting. On the input pinion shaft of the gearbox, a pulley is mounted which drives a rubber belt which rotates the pulley that is mounted to the horizontal flighting that reaches along the floor of the tank in the grain cart. In this instance, the minimum distance of the axes is determined by the radius of the vertical auger flighting plus the radius of the horizontal auger drive shaft. The unload auger is capable of pivoting up and down from the axis of the horizontal drag auger. Furthermore, a gearbox and adjacent housing creates a minimum sweep radius R that must be cleared by the hitch frame members and not be vulnerable to striking objects on the ground or contacting the hitch frame members during pivoting motion. It is desired by the customers to have available either a left hand or right hand option to allow for a more comfortable operation based on their preference. Traditionally this is only possible with specific auger tubes that must be created for both left hand and right hand and unloading setups. Customers may prefer one option over the other so being able to accommodate both options will require a different build of auger and ultimately different build of cart.

SUMMARY OF THE INVENTION

According to one aspect of the invention there is provided an agricultural wagon for receiving particulate material therein, the grain cart comprising:

a storage bin extending in longitudinal direction between a first end and a second end of the storage bin for receiving the particulate material therein;

wheels supporting the storage bin thereon for rolling movement along a ground surface in the longitudinal direction of the storage bin;

a lower auger operable supported within the storage bin at a bottom end of the storage bin to convey the particulate material in the storage bin in the longitudinal direction to the first end of the bin;

an unload auger assembly supported at the first end of the storage bin to extend upwardly from an inlet end to an outlet end of the unload auger assembly;

the unload auger assembly including an unload auger tube in communication with the lower auger within the bottom end of the storage bin at the inlet end of the unload auger assembly;

the unload auger tube being pivotal relative to the storage bin about a swing axis oriented in the longitudinal direction of the storage bin between a first position offset laterally from the lower auger to one side of the storage bin and a second position offset laterally from the lower auger to an opposing side of the storage bin;

the unload auger assembly including an unload auger rotatably supported in the unload auger tube to convey the particulate material upwardly from the inlet end to the outlet end of the unload auger assembly;

a gearbox supported at the inlet end of the unload auger assembly so as to be operably connected to both the lower auger and the unload auger;

the gearbox comprising:
  an input shaft adapted to receive an input drive rotation from a drive source externally of the gearbox for rotation of the input shaft about an input axis of the input shaft;
  a main shaft having a first output portion which is directly coupled to the unload auger for rotation together about a main axis of the main shaft;
  an output shaft having a second output portion which is directly coupled to the lower auger for rotation together about an output axis of the output shaft; and
  a plurality of transfer gears operatively connected between the input shaft, the main shaft and the output shaft to transfer the input drive rotation from the input shaft to both the main shaft and the output shaft.

The transfer gears preferably include a pair of input transfer gears operatively connected between the input shaft and the main shaft so as to transfer the input drive rotation from the input shaft to the main shaft and a pair of output transfer gears operatively connected between the output shaft and one of input shaft or the main shaft so as to transfer the input drive rotation to the output shaft.

By providing a gearbox connected to both the lower auger and the unload auger which further includes an input shaft for receiving a drive rotation from an external source at the front end of the grain cart, no accommodations are required for a driveshaft extending below the storage bin along the length of the grain cart so that the lower auger at the bottom of the storage bin can be located closer to the ground than prior art configurations, resulting in a more stable support of the grain cart. By further providing a main shaft within the gearbox which directly drives one of the augers, the gearbox can remain compact in design so as to maintain a sufficient ground clearance and so as to further enable pivoting of the unload auger to opposing left and right discharge positions without interference with the frame of the grain cart.

As compared to the more traditional dual auger system, the new direct drive method combines the functions of both the right-angle gearbox and drive belts into one single gearbox to simultaneously turn the vertical auger and horizontal auger using only one input shaft. The gearbox protrudes into the transitional housing where the two augers meet and both the horizontal and vertical augers connect to the output shafts.

The new method may utilize a reduction bevel gear set to reduce the shaft speed from 1000 to 500 rpm, and this shaft is directly connected to the vertical auger flighting which traditionally requires more than 60% of the total horse power.

Preferably, the lower auger and the unload auger are oriented perpendicularly relative to one another.

The output shaft is preferably concentric with the swing axis such that the gearbox is pivotal with the unload auger tube about the swing axis.

When the agricultural wagon includes a tow connection at the first end of the storage bin for connection to a towing vehicle, preferably the gearbox is located at the first end of the storage bin for connection of the input shaft to the towing vehicle.

Preferably the lower auger is rotatable about a lower axis and the input axis of the input shaft is parallel to and spaced radially from the lower axis in a radial direction opposite from the unload auger.

The input transfer gears may comprise bevel gears supported at inner ends of the input shaft and the main shaft respectively. More particularly, the input transfer gears may comprise a first input transfer gear fixed on the input shaft to rotate together and a second input transfer gear fixed on the main shaft to rotate together, the first input transfer gear having fewer teeth than the second input transfer gear.

According to a first embodiment, the output transfer gears are supported on the main shaft and the output shaft respectively so as to transfer the input drive rotation from the main shaft to the output shaft. In this instance the secondary gear set may be connected to the driven shaft from the first gear set and operates at a 1:1 ratio as it already is down to the 500 rpm speed. The 1:1 gear ratio also makes for more space efficient gear set. The vertical distance the input shaft and the output shaft are apart allowing for the gearbox to protrude into the transitional housing with minimal obstruction from the larger, primary driven gear set which can then be located outside of the outer wall of the transitional housing. The lower input shaft also aids in proper drive shaft alignment to the standard shaft tractor PTO shaft height on common tractors.

According to the first embodiment, the output transfer gears may comprise a first output transfer gear fixed on the main shaft to rotate together and a second output transfer gear fixed on the output shaft to rotate together, in which the first output transfer gear is supported on the main shaft at a location offset radially from an axis about which the second one of the augers rotates in a radial direction that the first one of the augers extends away from the second one of the augers.

In the first embodiment, the input shaft is preferably operatively connected to the main shaft at a location which is diametrically opposite from the first output transfer gear in relation to the output shaft that is coupled to the second one of the augers.

In the first embodiment, the input transfer gears may comprise a first input transfer gear fixed on the input shaft to rotate together and a second input transfer gear fixed on the main shaft to rotate together in which the second input transfer gear meshes with the first input transfer gear to transfer the input drive rotation from the input shaft to the main shaft, and in which the second input transfer gear is supported on the main shaft diametrically opposite from the first output transfer gear in relation to the output shaft that is coupled to the second one of the augers.

In the first embodiment, the first output portion of the main shaft may be fixedly coupled to the unload auger for rotation together and the second output portion of the output shaft may be fixedly coupled to the lower auger for rotation together.

The main axis of the main shaft, the input axis of the input shaft and the output axis of the output shaft preferably lie in a common plane in the first embodiment.

According to a second embodiment, the output transfer gears are supported on the input shaft and the output shaft respectively so as to transfer the input drive rotation directly from the input shaft to the output shaft.

In the second embodiment, the gearbox may further comprise a shifting mechanism operatively connected to the output transfer gears such that the gears can be shifted between an engaged position in which the output shaft and the input shaft are connected by the output transfer gears for rotation together and a disengaged position in which the output shaft and the input shaft are rotatable independently of one another.

In the second embodiment, the output transfer gears may comprise a first output transfer gear fixed on the input shaft to rotate together and a second output transfer gear fixed on the output shaft to rotate together, in which the first output transfer gear has fewer teeth than the second output transfer gear.

In the second embodiment, the input axis of the input shaft and the main axis of the main shaft preferably lie in a common plane, and the output axis of the output shaft preferably lies parallel and spaced apart from the common plane.

According to another aspect of the present invention there is provided an agricultural wagon for receiving particulate material therein, the grain cart comprising:
  a storage bin extending in longitudinal direction between a first end and a second end of the storage bin for receiving the particulate material therein;
  wheels supporting the storage bin thereon for rolling movement along a ground surface in the longitudinal direction of the storage bin;
  a lower auger operable supported within the storage bin at a bottom end of the storage bin to convey the particulate material in the storage bin in the longitudinal direction to the first end of the bin;
  an unload auger assembly supported at the first end of the storage bin to extend upwardly from an inlet end to an outlet end of the unload auger assembly;

the unload auger assembly including an unload auger tube in communication with the lower auger within the bottom end of the storage bin at the inlet end of the unload auger assembly;

the unload auger tube being pivotal relative to the storage bin about a swing axis oriented in the longitudinal direction of the storage bin between a first position offset laterally from the lower auger to one side of the storage bin and a second position offset laterally from the lower auger to an opposing side of the storage bin;

the unload auger assembly including an unload auger rotatably supported in the unload auger tube to convey the particulate material upwardly from the inlet end to the outlet end of the unload auger assembly;

a gearbox supported at the inlet end of the unload auger assembly so as to be operably connected to both the lower auger and the unload auger;

the gearbox comprising:
  a main shaft having a first output portion which is directly coupled to a first one of the lower auger and the unload auger for rotation together about a main axis of the main shaft;
  an input shaft adapted to receive an input drive rotation from a drive source externally of the gearbox;
  the input shaft being operatively connected to the main shaft to transfer the input drive rotation from the input shaft to the main shaft;
  an output shaft having a second output portion which is directly coupled to a second one of the lower auger and the unload auger for rotation together about an output axis of the output shaft; and
  a pair of output transfer gears operatively connected between the main shaft and the output shaft to transfer the input drive rotation from the main shaft to the output shaft.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Referring to the accompanying figures, there is illustrated an agricultural wagon generally indicated by reference numeral 10. The wagon 10 is suitable for use together with a towing vehicle, for example an agricultural tractor having a power take off shaft for supplying rotational power to the wagon. The wagon is suited for carrying grain or other particulate material agricultural products as it is towed behind the towing vehicle.

The wagon 10 includes a main frame 12 extending in a longitudinal direction along a bottom side of the wagon from a front end 14 to a rear end 16 of the wagon. A hitch frame 18 comprised of two hitch arms extends forwardly from the front end of the main frame to a hitch connection 20 which is suitable for connection to the towing vehicle. The main frame is supported on wheels 22 which are oriented for rolling movement along the ground, forwardly in the longitudinal direction of the main frame for following the towing vehicle.

A storage bin 24 is supported on the main frame to extend in the longitudinal direction between the front and rear ends of the wagon. The storage bin is a hopper type bin having an open top for loading particulate material into the bin from another implement. A retractable cover may be provided in operative relationship to the open top end of the bin. The bin is enclosed at both ends by two upright end walls 26 at the opposing front and rear ends respectively. Two side walls 28 extends longitudinally between the end walls 26 at laterally opposing sides of the bin. The side wall 28 are tapered downwardly and inwardly from the open top end of the bin to the bottom end of the bin where a trough is formed extending in the longitudinal direction substantially along the full length of the bin.

A lower auger 30 is supported within the trough at the bottom end of the storage bin 24 for rotation about a lower axis of the lower auger which extends in the longitudinal direction of the bin. The auger includes a shaft 32 defining the lower axis, and an auger flight 34 extending helically about the shaft so as to be arranged for conveying particulate material at the bottom end of the storage bin 24 longitudinally towards the forward end of the bin. The lower auger communicates through an auger opening 36 at the bottom of the front end wall of the bin for discharging the particulate material from the bin therethrough by operation of the lower auger.

Figure 5:
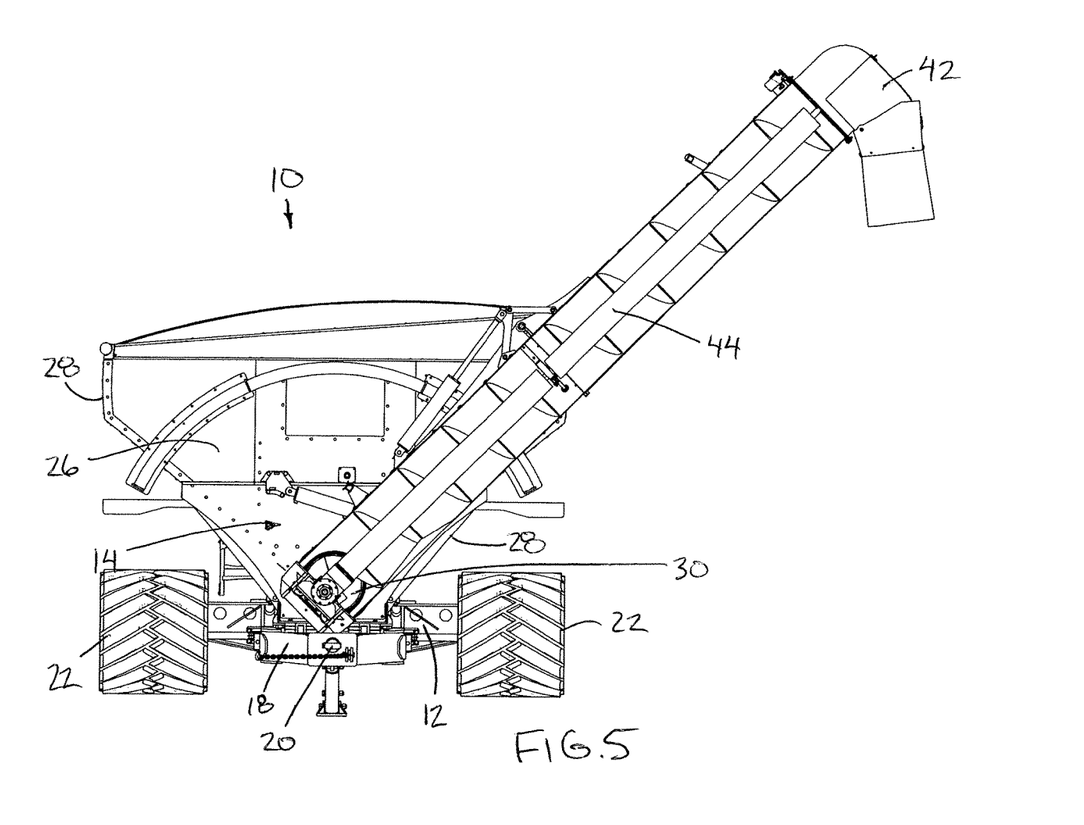
FIGS. 5 and 6 are front end elevational views of the agricultural wagon with a portion of the auger tube of the unload auger assembly shown removed for clarity, in which the unload auger assembly is shown in right side and left side discharged positions respectively according to the first embodiment of the gearbox shown in FIG. 1.
Figure 6:
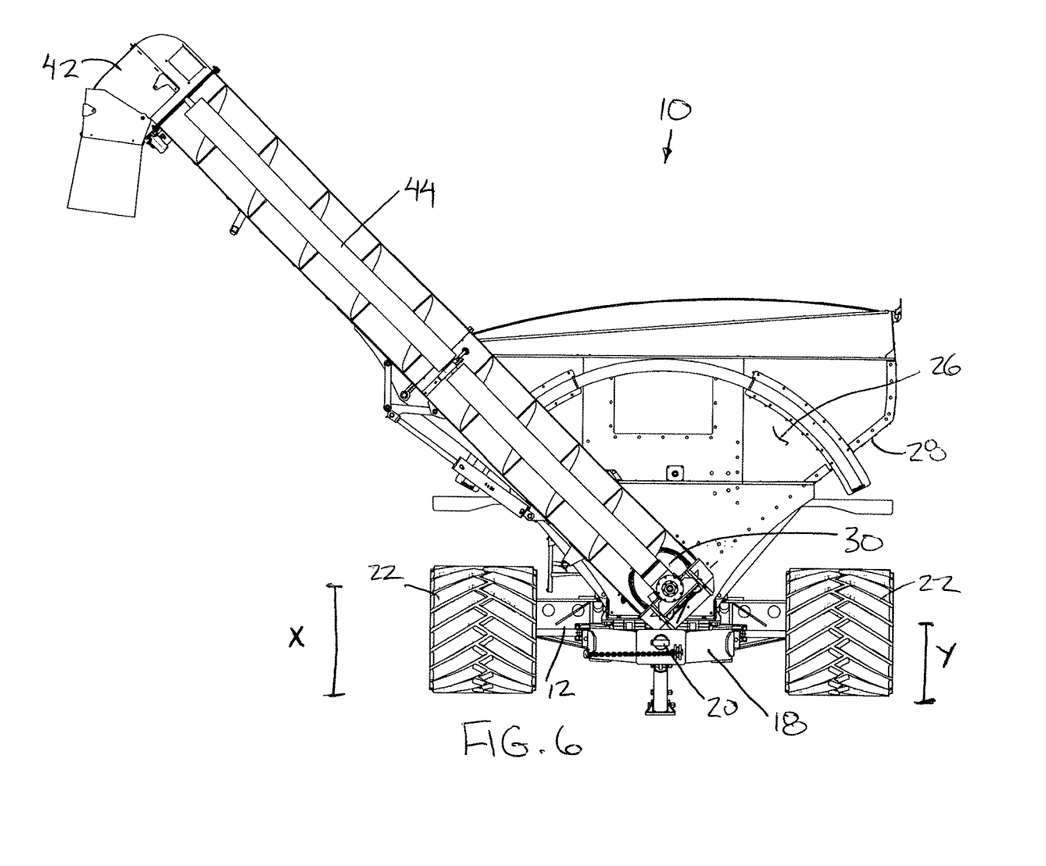

An unload auger assembly is supported externally of the storage bin at the front end of the wagon for receiving material discharge from the bin by the lower auger to subsequently convey the particulate material upwardly and laterally outwardly to one side of the wagon for discharging to another implement or another storage location. The unload auger assembly includes an auger housing which is rotatably coupled to the front end of the bin for pivotal movement about a pivot axis which is concentric with the lower axis of the lower auger between a first unloading position for discharging laterally to one side of the wagon as shown in FIG. 5 and a second unloading position for discharging to an opposing lateral side of the wagon as shown in FIG. 6.

The unload auger housing includes a transition boot 38 which forms a bend of approximately 90° between an inlet end of the boot aligned with the auger opening 36 receiving the lower auger 30 discharging material therethrough and an outlet end of the boot in alignment with an unload auger tube 40 in communication therewith.

The unload auger tube 40 extends radially upward relative to the lower axis such that a longitudinal axis of the auger tube is perpendicular to the lower axis of the lower auger. The auger tube 40 extends longitudinally from an inlet end coupled to the transition boot 38 to an outlet and coupled to a discharge boot 42. The discharge boot comprises another elbow for redirecting flow exiting the unload auger tube downwardly towards the ground when the unload auger tube is oriented to extend laterally outward at an upward slope in either the left hand side or right hand side discharge positions of FIGS. 5 and 6. The discharge boot 42 is coupled to the auger tube for rotation relative to the auger tube about the longitudinal axis of the auger tube to vary the orientation of the boot depending upon whether the unload auger is offset for discharge to the left or right side of the wagon.

The unload auger assembly further includes an unload auger 44 supported within the auger tube for rotation about an unload axis oriented in the longitudinal direction of the auger tube. The unload auger includes a shaft with a helical auger flight thereon for rotation together relative to the auger tube for conveying particulate material from the transition boot 38 at the bottom end to the discharge boot 42 at the top end of the unload auger tube.

A gearbox 46 is supported at the location of the transition boot 38 at the front end of the bin for operative connection between the power take off shaft of the towing vehicle, the bottom/inlet end of the unload auger 44, and the front end of the lower auger 30.

Two embodiments of the gearbox 46 are shown in the accompanying Figures. Turning initially to FIGS. 1 through 7, the gearbox 46 in this instance includes a gearbox housing 48 which is mounted to extend through an outer wall of the transition boot 38 such that a portion of the gearbox housing is received within the interior of the boot to be exposed to the flow of particulate material therethrough from the lower auger to the unload auger, while a portion of the gearbox housing remains supported externally of the transition boot. The gearbox housing 48 is pivotal together with the transition boot 38 and the unload auger tube 40 about to the lower axis between the first and second discharge positions of FIGS. 5 and 6 respectively.

A main shaft 50 is rotatably supported by bearings within the gearbox housing. The main shaft is concentrically aligned with the unload axis of the unload auger and extends axially between a first end fixedly coupled to the bottom end of the shaft of the unload auger for rotation together and a second end received within the portion of the gearbox housing which is external of the transition boot 38. The first end of the main shaft communicates through seals in the boundary wall of the gearbox housing to define a first output portion 52 extending externally of the gearbox housing within the transition boot 38 for coupling to the end of the unload auger.

An output shaft 54 is also rotatably supported within the gearbox housing by suitable bearings so as to be concentrically aligned with the lower axis of the lower auger. The output shaft extends axially between a first end fixedly coupled to the front end of the shaft of the lower auger for rotation together and a second end received within the gearbox housing for operative connection to the main shaft for transferring rotation therebetween as described in further detail below. The first end of the output shaft communicates through seals in the boundary wall of the gearbox housing to define a second output portion 56 of the gearbox extending externally of the gearbox housing within the transition boot for coupling to the end of the lower auger.

An input shaft 58 is rotatably supported within the gearbox housing by suitable bearings within the portion of the gearbox housing which is situated externally of the transfer boot 38. The input shaft is rotatable about an input axis which lies parallel to the lower axis of the lower auger at a location spaced radially therefrom in a direction which is diametrically opposed from the unload auger. The input axis lies in a common plane with both of the output axis of the output shaft and the main axis of the main shaft.

More particularly the input shaft extends axially between a first end arranged to be fixedly coupled to a drive shaft connected between the power take off of the tractor and the input shaft of the gearbox and a second end received within the gearbox housing for operative connection to the main shaft for transferring rotation therebetween as described in further detail below. The first end of the input shaft communicates through seals in the boundary wall of the gearbox housing to define an input portion 60 of the gearbox extending externally of the gearbox housing and externally of the transition boot for coupling to the drive shaft from the tractor.

Figure 1:
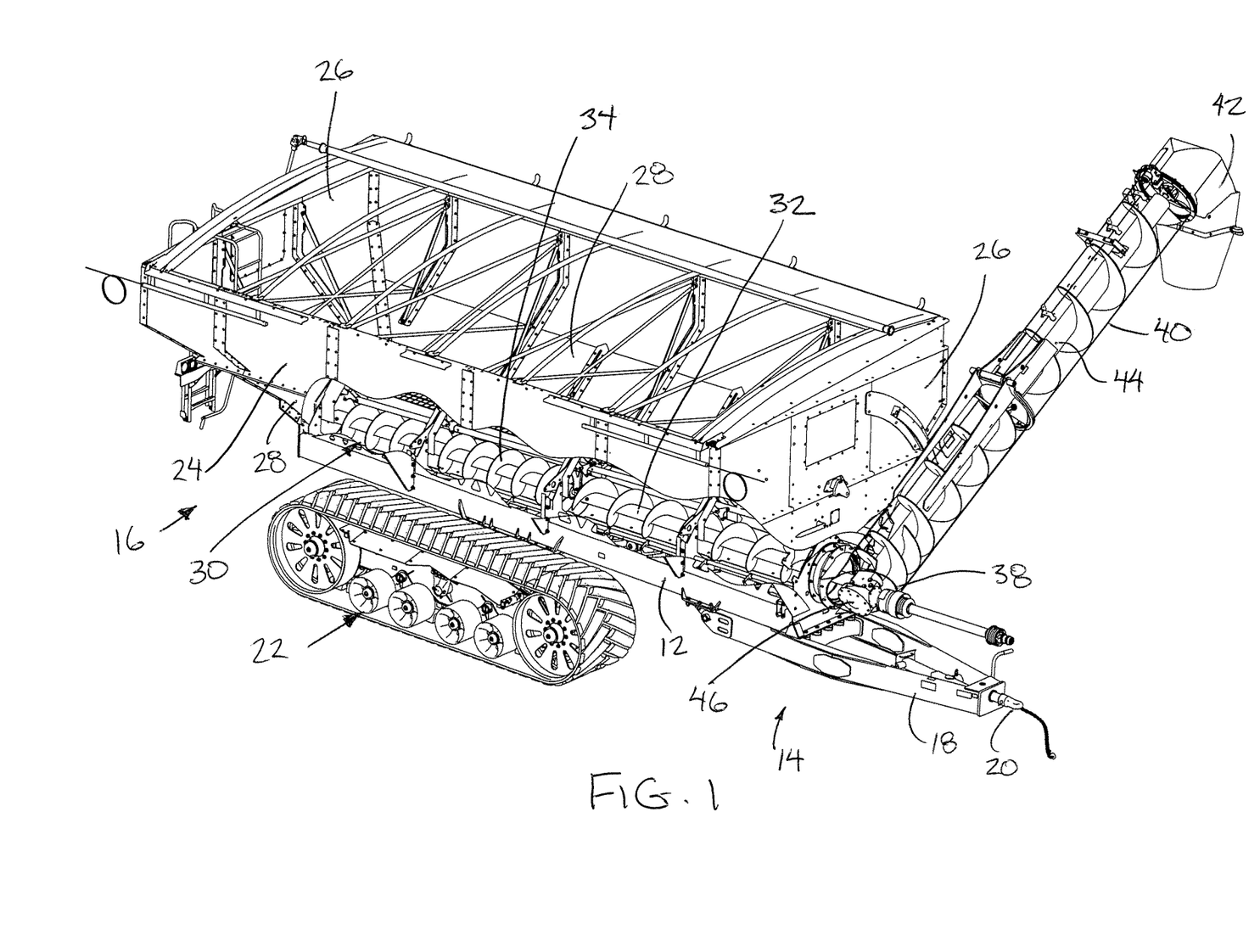
FIG. 1 is a perspective view of an agricultural wagon including a first embodiment of a gearbox between the lower auger and the unload auger of the wagon.
Figure 2:
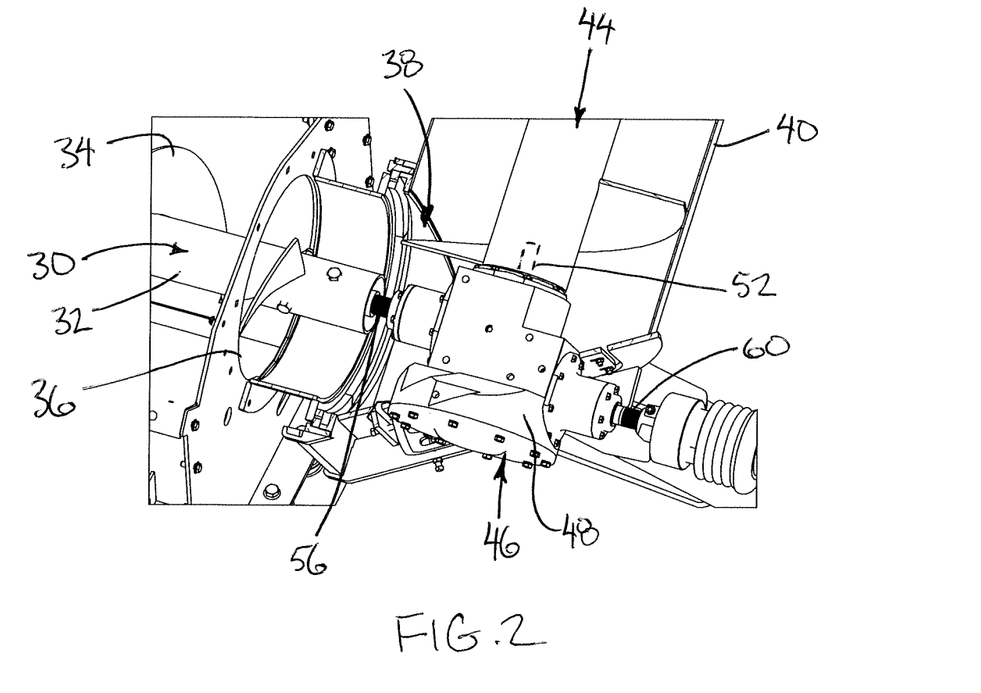
FIG. 2 is a partly sectional view of the first embodiment of the gearbox according to FIG. 1.
Figure 3:
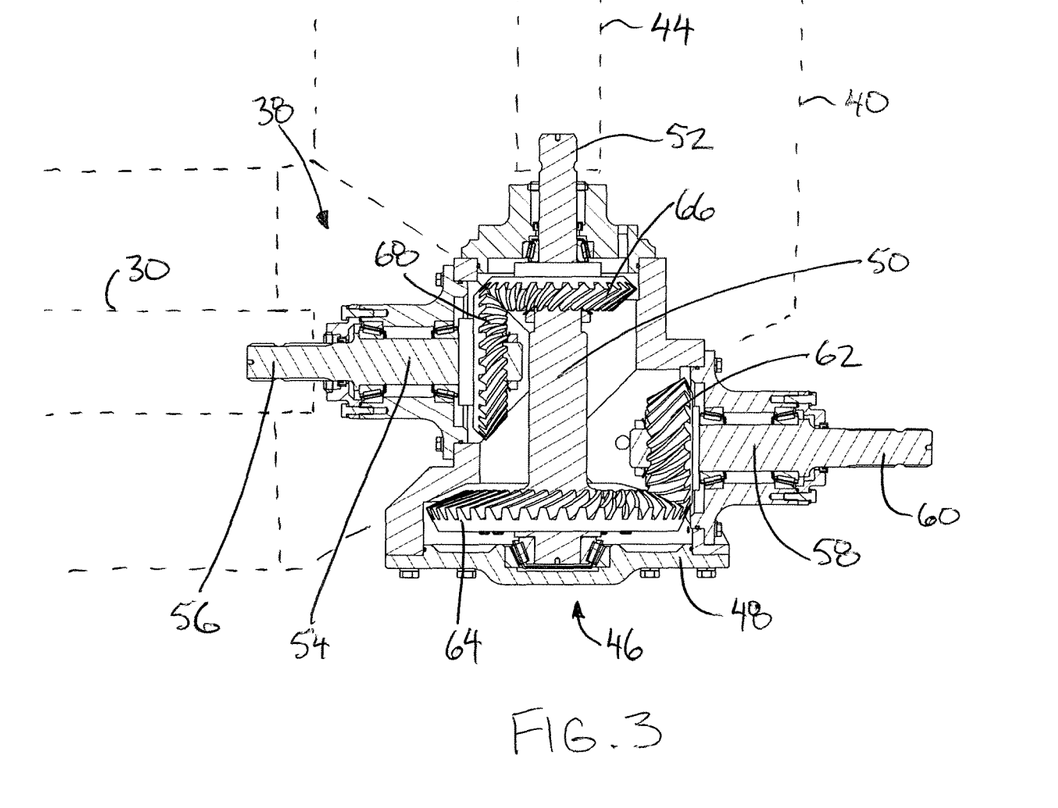
FIG. 3 is a sectional view of the gearbox according to the first embodiment of FIG. 1 along a plane containing the axis of rotation of both augers.
Figure 4:
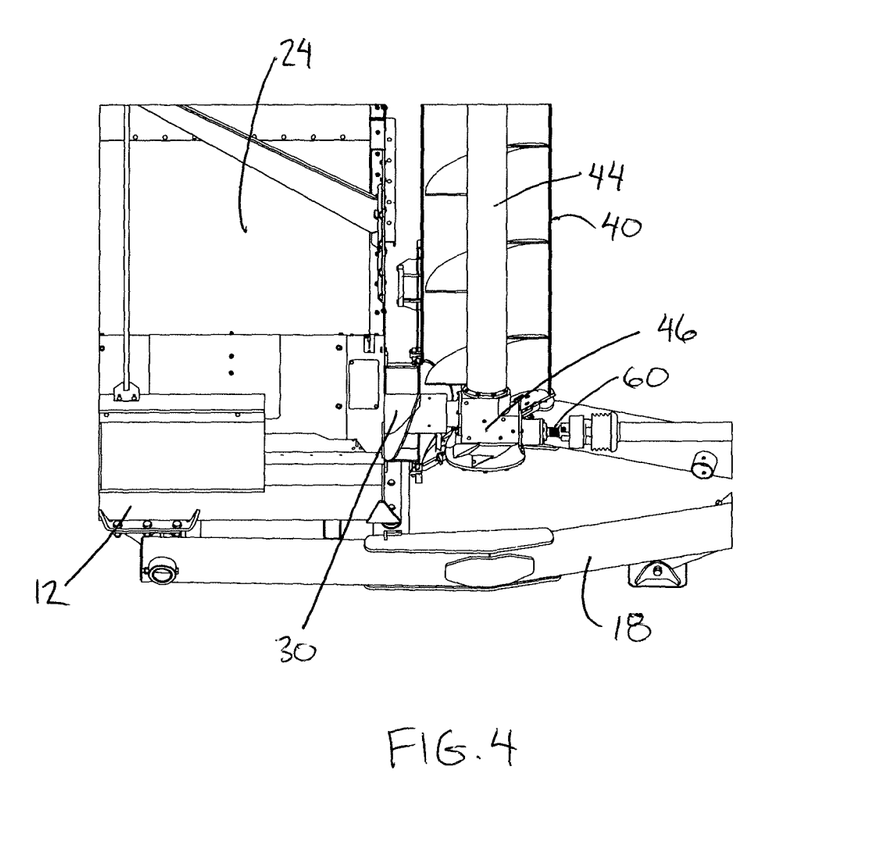
FIG. 4 is a partly sectional side elevational view of the unload auger at the front end of the agricultural wagon according to the first embodiment of the gearbox shown in FIG. 1.

The input shaft 58 communicates an input drive rotation from the tractor to the main shaft through a pair of input transfer gears which include, a first input transfer gear 62 fixedly coupled at the second end of the input shaft and a second input transfer gear 64 fixedly coupled to the second end of the main shaft. Both input transfer gears comprise bevel gears which are meshed with one another. The second input transfer gear 64 has more gear teeth than the first input transfer gear to provide a gear reduction for slowing the input rotation from the input shaft to the main shaft. The second input transfer gear 64 is offset radially away from the lower axis at a location diametrically opposed from the unload auger at a location within the gearbox housing which is external of the transfer boot 38. As best illustrated in FIG. 3, the second input transfer gear 64 on the main shaft 50 and the first output portion 52 of the main shaft 50 are thus located at diametrically opposing sides of the output axis of the output shaft 56 that is directly connected to the shaft of the lower auger that defines the lower axis.

The main shaft communicates the drive rotation received from the input shaft to the output shaft through a pair of output transfer gears which include a first output transfer gear 66 fixedly supported on the main shaft near the first end of the main shaft but within the interior of the gearbox housing and a second output transfer gear 68 fixedly supported on the second end of the output shaft. Both output transfer gears comprise bevel gears which are meshed with one another and which have an equal number of gear teeth so that the lower auger is driven to rotate at the same rate of rotation as the unload auger. The first output transfer gear 66 on the main shaft is offset radially relative to the lower axis of the lower auger in the same direction that the unload auger extends radially from the lower axis such that the second output transfer gear 68 is situated between the first output transfer gear 66 end of the second input transfer gear 64 in the axial direction along the main shaft of the gearbox.

As described herein, and input drive rotation from the power take off shaft of the towing vehicle is communicated through a drive shaft to the input portion 60 of the input shaft 58 protruding externally of the gearbox housing. The rotation of the input shaft 58 is then transferred by the first and second input transfer gears to drive rotation of the main shaft at a reduced rate of rotation relative to the input shaft. Rotation of the main shaft directly drives rotation of the unload auger while simultaneously rotating the output shaft at the same rate of rotation by the transfer of the drive through the first and second output transfer gears.

The resulting arrangement of the gearbox provides a gearbox housing which is lower in profile and which does not extend substantially below the lower auger at the bottom end of the storage bin. The height of the lower auger axis relative to the ground as shown by reference character X in FIG. 6, can be kept relatively low for lowering the overall height of the storage bin from the ground, while still maintaining a relatively high clearance for the gearbox housing as shown by reference character Y in FIG. 6.

Figure 7:
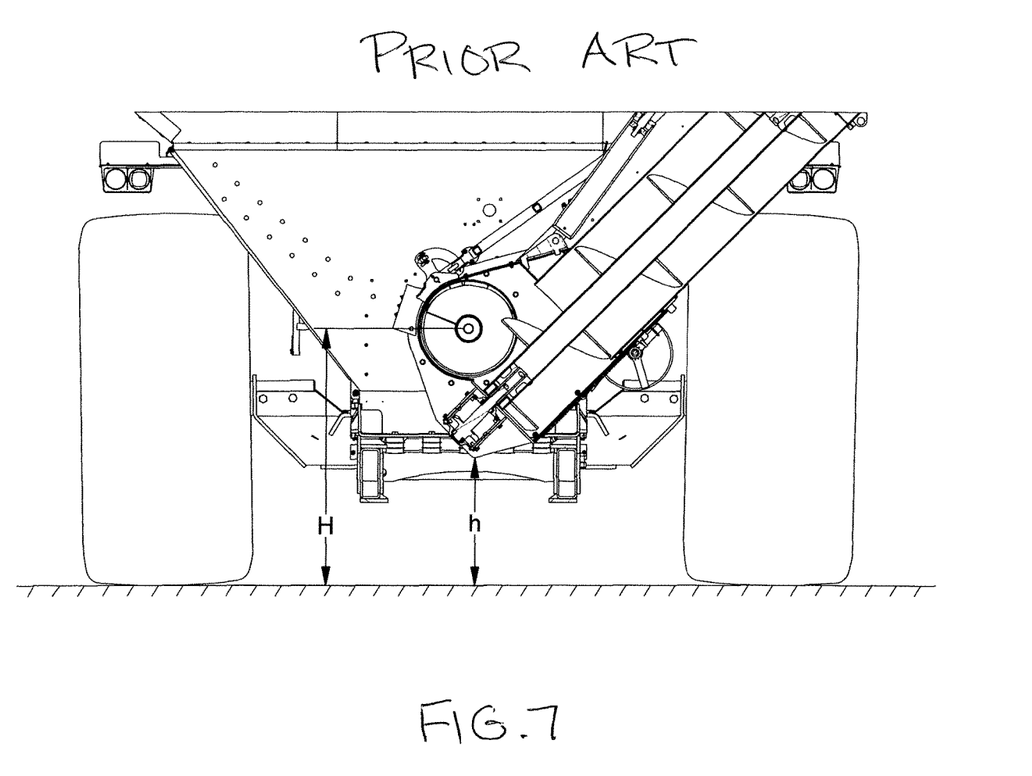
FIG. 7 is a sectional front end view of a prior art agricultural wagon illustrating a height of the bottom end of the unload auger from the ground relative to a height of the lower auger in the storage bin from the ground.
Figure 8:
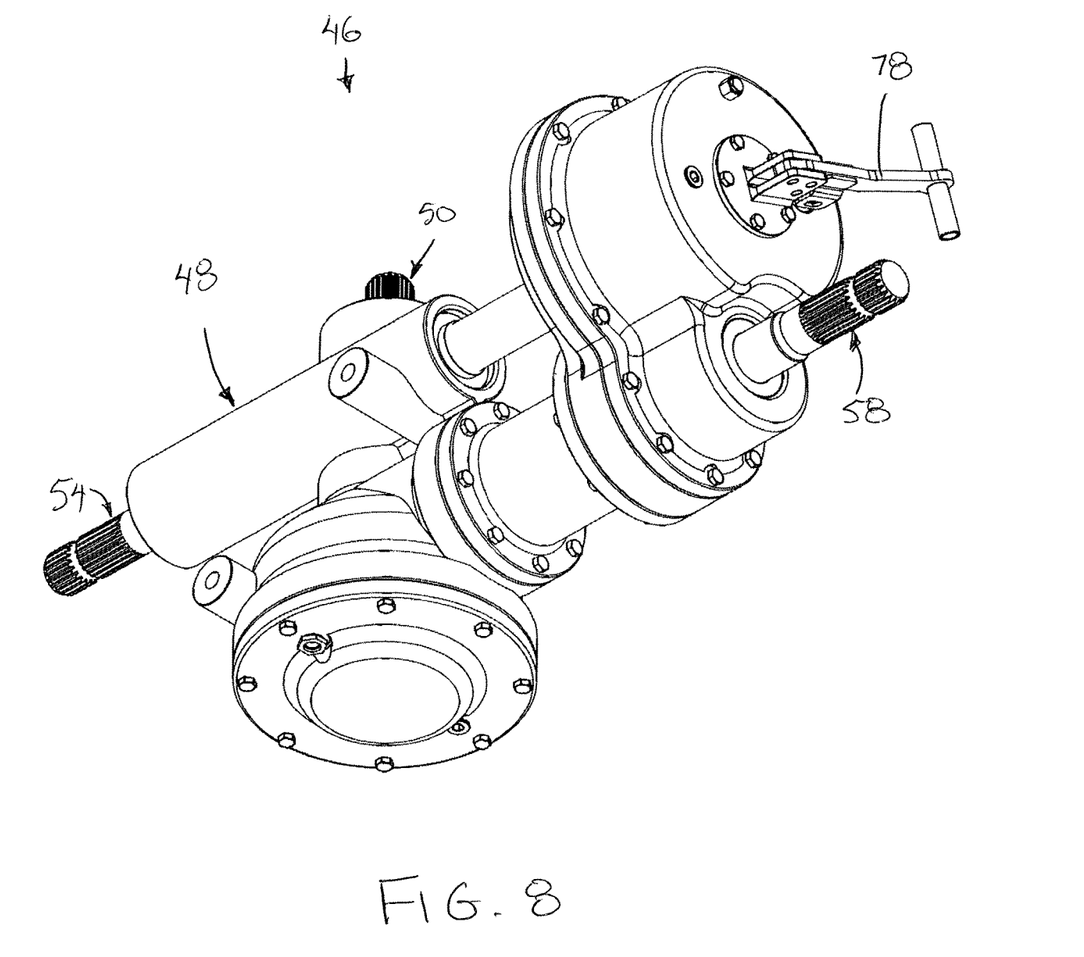
FIG. 8 is an isometric view of a second embodiment of the gearbox.
Figure 9:
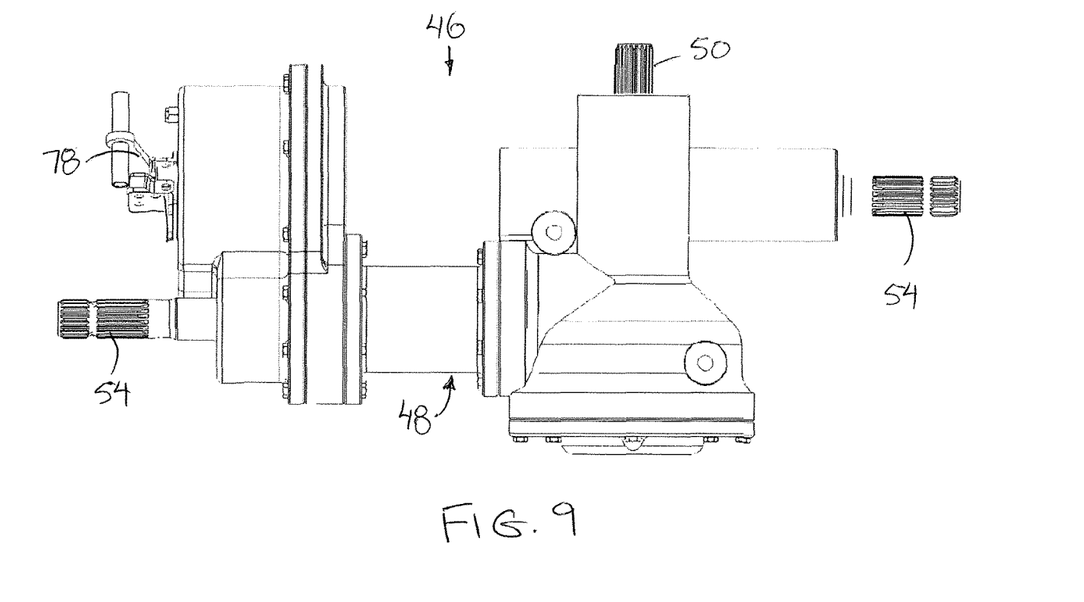
FIG. 9 is a side elevational view of the gearbox according to the second embodiment of FIG. 8.
Figure 10:
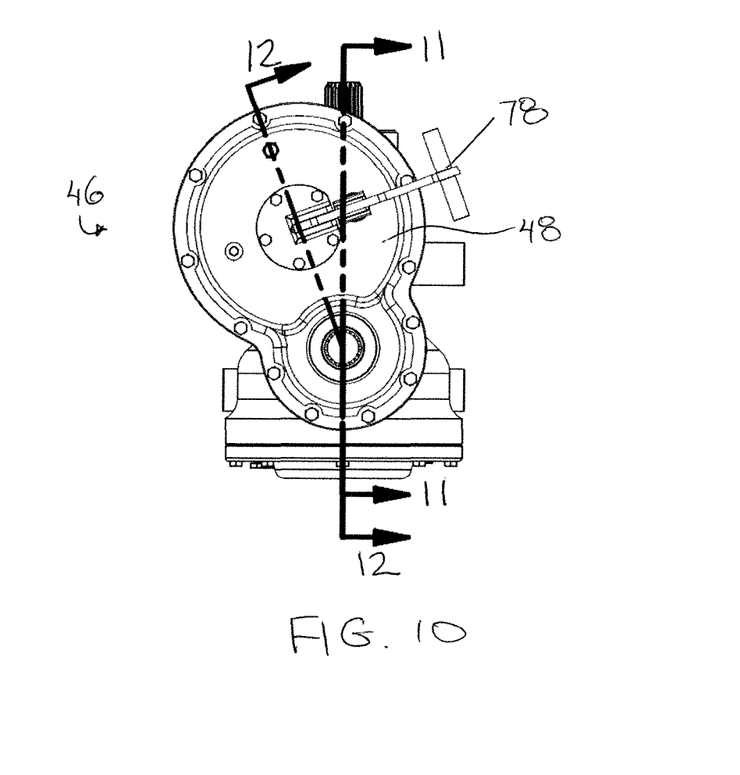
FIG. 10 is an end elevational view of the gearbox according to the second embodiment of FIG. 8.
Figure 11:
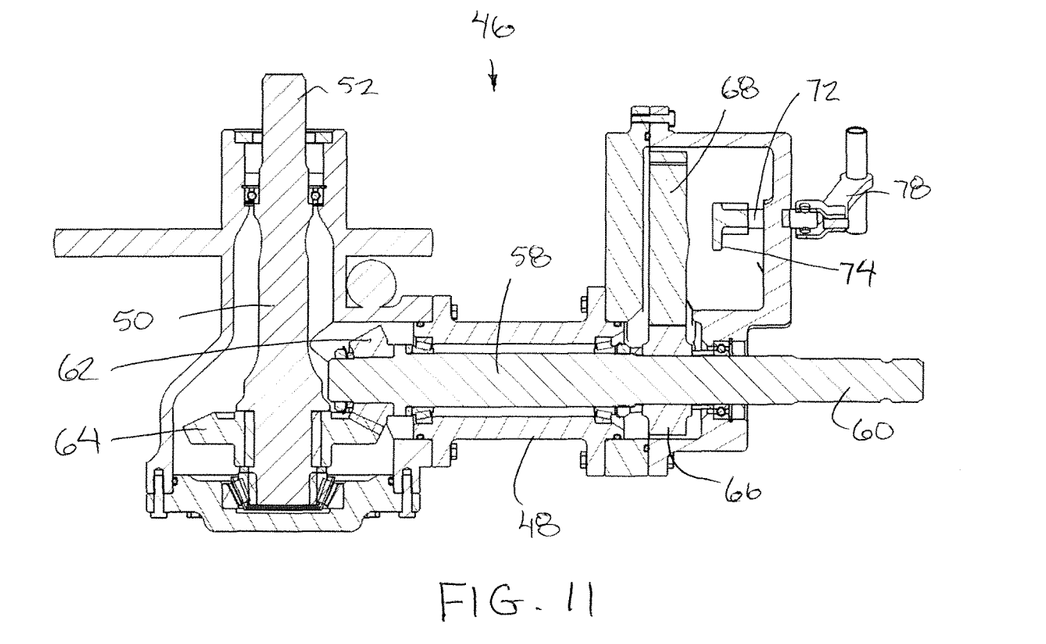
FIG. 11 is a sectional view along the line 11-11 in FIG. 10.
Figure 12:
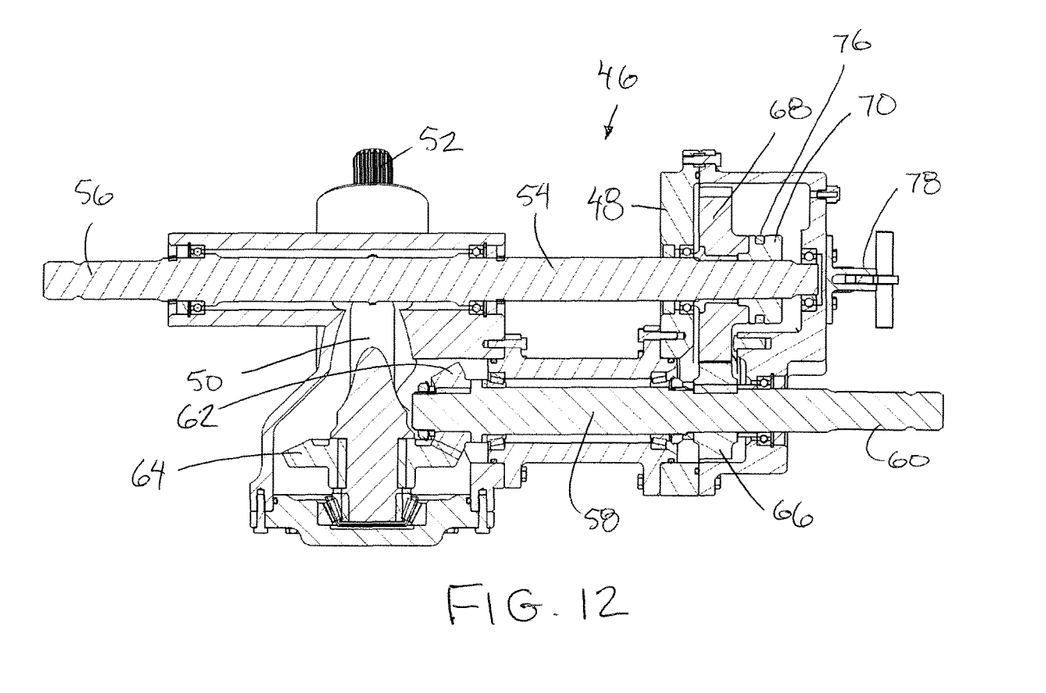
FIG. 12 is a sectional view along the line 12-12 in FIG. 10.

In contrast, in a prior art arrangement according to FIG. 7, when accommodating prior art gearbox designs or accommodating driveshafts extending below the lower auger, the height of the lower auger axis relative to the ground as shown by reference character H in FIG. 7 to provide sufficient ground clearance for the gearbox, shown by reference character h in FIG. 7, results in the overall storage bin being much higher in elevation and thus inherently less stable in transport.

The gearbox of the present invention boasts several advantages over traditional methods. The following benefits are noted:

(1) The design allows for the horizontal auger and vertical auger axes to intersect completely with no offset. (a) This allows for a symmetric design that can be used in the Left-hand or Right-hand configuration. (b) It reduces the lowest point of the auger significantly allowing the overall horizontal auger height to be lowered closer to the ground. This lowers the entire profile of the grain cart which in turn lowers the overall height. One advantage of a lower cart is that there is a lower center of gravity—providing a more stable cart. The cart is then significantly lower than the discharge auger of the combine that is filling the cart making it an easier and more comfortable operation. There is also gained capacity as height is the restriction. By lowering the bottom of the profile, the cross-section area of the grain cart can be increased without increasing overall height. This would translate to higher capacity per length of the cart providing high capacity machines or shorter bins with the same capacity without gaining height.

(2) With the gearbox aligned with both axes, it eliminates the need for a secondary transmission system such as drive belts, chain and sprockets, or another gear set.

Turning now to the second embodiment of FIGS. 8 through 12, the gearbox 46 in this instance is mounted at a similar location for connection to the lower auger and the unload auger, while remaining pivotal with the unload auger about the axis of the lower auger between left-side and right-side orientations.

The gearbox 46 in this instance again includes a gearbox housing 48 which is mounted to extend through an outer wall of the transition boot 38 such that a portion of the gearbox housing is received within the interior of the boot to be exposed to the flow of particular material therethrough from the lower auger to the unload auger, while a portion of the gearbox housing remains supported externally of the transition boot. The gearbox housing 48 is pivotal together with the transition boot 38 and the unload auger tube 40 about the lower axis between the first and second discharge positions of FIGS. 5 and 6 for example.

In the second embodiment, a main shaft 50 is rotatably supported by bearings within the housing. The main shaft is concentrically aligned with the unload axis of the unload auger and extends axially between a first end fixedly coupled to a bottom end of the shaft of the unload auger for rotation together and a second end received within the gearbox housing. The first end of the main shaft communicates through seals in the boundary wall of the gearbox housing to define a first output portion 52 extending externally of the gearbox housing within the transition boot 38 for coupling to the end of the unload auger.

In the second embodiment, the gearbox 46 again includes an output shaft 54 rotatably supported by suitable bearings so as to be concentrically aligned with the lower axis of the lower auger. The output shaft extends axially between a first end fixedly coupled to the front end of the shaft of the lower auger for rotation together and a second end received within the gearbox housing. The first end of the output shaft communicates through seals in the boundary wall of the gearbox housing to define a second output portion 56 of the gearbox extending externally of the gearbox housing within the transition boot for coupling to the end of the lower auger.

An input shaft 58 is also rotatably supported within the gearbox housing by suitable bearings within the gearbox. The input shaft is rotatable about an input axis which lies parallel to the lower axis of the lower auger at a location spaced radially therefrom in a direction which is diametrically opposed from the unload auger. The input axis lies in a common plane with the output axis of the output shaft; however, the main axis of the main shaft intersects that common plane, for example at an acute angle of approximately 20 to 30 degrees. The main axis also intersects the input axis in perpendicular relationship relative to one another.

More particularly, the input shaft extends axially between a first end arranged to be fixedly coupled to a drive shaft that is connected between the power take-off of the tractor and the input shaft of the gearbox and a second end received within the gearbox housing for operative connection to both the main shaft and the output shaft for transferring rotation therebetween as described in further detail below. The first end of the input shaft communicates through seals in the boundary wall of the gearbox housing to define an input portion 60 of the gearbox extending externally of the gearbox housing and externally of the transition boot for coupling to the drive shaft from the tractor.

The input shaft 58 communicates an input drive rotation from the tractor to the main shaft through a pair of input transfer gears which include a first input transfer gear 62 fixedly coupled at the second end of the input shaft and a second input transfer gear 64 fixedly coupled to the second end of the main shaft. Both input transfer gears comprise bevel gears which are meshed with one another. The second input transfer gear 64 has more gear teeth than the first input transfer gear to provide a gear reduction for slowing the input rotation from the input shaft to the main shaft. The second input transfer gear 64 is offset radially away from the lower axis at a location diametrically opposed from the unload auger.

The input shaft 58 also communicates the input drive rotation from the tractor to the output shaft through a pair of output transfer gears which include a first output transfer gear 66 at a fixed location along the input shaft between the input portion 60 and the input transfer gear 62, and a second output transfer gear 68 at a fixed axial location along the output shaft in proximity to the second end of the output shaft. The output transfer gears comprise spur gears which are meshed with one another. The second output transfer gear 68 has more gear teeth than the first output transfer gear 66 at the same gear ratio as the input transfer gears to provide a gear reduction for slowing the input rotation from the input shaft to the output shaft such that both the lower auger and the unload auger are rotated at the same rate.

A suitable shifting mechanism is provided to function as a clutch which selectively couples and un-couples rotation of the second output transfer gear 68 relative to the output shaft. In this instance, the second output transfer gear 68 is rotatable relative to the output shaft in a disengaged position of the shifting mechanism while being contained at a fixed axial location so as to remain in meshing engagement with the first output transfer gear 66. A shift member 70 is mounted to be axially slidable along the output shaft while remaining keyed to rotate together with the output shaft so that the shift member is movable between a disengaged position and an engaged position of the shifting mechanism. In the disengaged position, the shift member 70 and the second output transfer gear 68 are uncoupled and disengaged from one another so that the second output transfer gear 68 rotates with the first output transfer gear relative to both the shift member 70 and the output shaft which may remain stationary. In the engaged position, the shift member 70 includes cooperating elements thereon which are mated to and interlocked with corresponding cooperating elements on the second output transfer gear 68 such that the second output transfer gear 68 is held in fixed relation to the output shaft for rotation together about the output axis. Accordingly, in the engaged position, the input rotation of the input shaft transfers drive through the output transfer gears to the output shaft in addition to the main shaft.

The shift member is operated between engaged and disengaged positions by an actuator shaft 72 supported in a wall of the gearbox housing for axial sliding along a longitudinal axis of the actuator shaft 72 which lies parallel to the output shaft. A suitable lug 74 at an inner end of the shaft within the gearbox is received within a circumferential groove 76 in the shift member 70 such that the shift member and the actuator shaft 72 are movable together in the axial direction of the output shaft while the shift member 70 remains rotatable about the output axis relative to the actuator shaft. The outer end of the actuator shaft protrudes externally from the housing such that an operator can manually displace the actuator shaft and the shift member therewith between the engaged and disengaged positions. A suitable spring may be provided to bias the actuator shaft into the engaged position. In the illustrated embodiment an external lever 78 is pivotally mounted on the exterior of the gearbox housing while being pivotally connected to the outer end of the actuator shaft such that the actuator shaft is axially displaced between engaged and disengaged positions by pivoting of the external lever. In this manner, the gearbox can be operated to only transfer drive to the lower auger in one mode, while transferring drive to both the lower auger and the unload auger in another mode.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An agricultural wagon for receiving particulate material therein, the agricultural wagon comprising:

a storage bin extending in longitudinal direction between a first end and a second end of the storage bin for receiving the particulate material therein;

wheels supporting the storage bin thereon for rolling movement along a ground surface in the longitudinal direction of the storage bin;

a lower auger operably supported within the storage bin at a bottom end of the storage bin to convey the particulate material in the storage bin in the longitudinal direction to the first end of the bin;

an unload auger assembly supported at the first end of the storage bin to extend upwardly from an inlet end to an outlet end of the unload auger assembly;

the unload auger assembly including an unload auger tube in communication with the lower auger within the bottom end of the storage bin at the inlet end of the unload auger assembly;

the unload auger tube being pivotal relative to the storage bin about a swing axis oriented in the longitudinal direction of the storage bin between a first position offset laterally from the lower auger to one side of the storage bin and a second position offset laterally from the lower auger to an opposing side of the storage bin;

the unload auger assembly including an unload auger rotatably supported in the unload auger tube to convey the particulate material upwardly from the inlet end to the outlet end of the unload auger assembly;

a gearbox supported at the inlet end of the unload auger assembly so as to be operably connected to both the lower auger and the unload auger;

the gearbox comprising:

an input shaft adapted to receive an input drive rotation from a drive source externally of the gearbox for rotation of the input shaft about an input axis of the input shaft;

a main shaft having a first output portion which is directly coupled to the unload auger for rotation together about a main axis of the main shaft;

an output shaft having a second output portion which is directly coupled to the lower auger for rotation together about an output axis of the output shaft; and a plurality of transfer gears operatively connected between the input shaft, the main shaft and the output shaft to transfer the input drive rotation from the input shaft to both the main shaft and the output shaft;

wherein the transfer gears include a pair of input transfer gears operatively connected between the input shaft and the main shaft so as to transfer the input drive rotation from the input shaft to the main shaft and a pair of output transfer gears operatively connected between the output shaft and one of input shaft or the main shaft so as to transfer the input drive rotation to the output shaft; and wherein the input transfer gears comprise a first input transfer gear fixed on the input shaft to rotate together and a second input transfer gear fixed on the main shaft to rotate together, the first input transfer gear having fewer teeth than the second input transfer gear; and wherein the second input transfer gear on the main shaft and the first output portion of the main shaft are at diametrically opposing sides of the output axis of the output shaft.

2. The agricultural wagon according to claim 1 wherein the lower auger and the unload auger are oriented perpendicularly relative to one another.

3. The agricultural wagon according to claim 1 wherein the output shaft is concentric with the swing axis and wherein the gearbox is pivotal with the unload auger tube about the swing axis.

4. The agricultural wagon according to claim 1 wherein the agricultural wagon includes a tow connection at the first end of the storage bin for connection to a towing vehicle and wherein the gearbox is located at the first end of the storage bin for connection of the input shaft to the towing vehicle.

5. The agricultural wagon according to claim 1 wherein the lower auger is rotatable about a lower axis and the input axis of the input shaft is parallel to and spaced radially from the lower axis in a radial direction opposite from the unload auger.

6. The agricultural wagon according to claim 1 wherein the input transfer gears comprise bevel gears supported at inner ends of the input shaft and the main shaft respectively.

7. The agricultural wagon according to claim 1 wherein the output transfer gears are supported on the main shaft and the output shaft respectively so as to transfer the input drive rotation from the main shaft to the output shaft.

8. An agricultural wagon for receiving particulate material therein, the agricultural wagon comprising:
  a storage bin extending in longitudinal direction between a first end and a second end of the storage bin for receiving the particulate material therein;
  wheels supporting the storage bin thereon for rolling movement along a ground surface in the longitudinal direction of the storage bin;
  a lower auger operably supported within the storage bin at a bottom end of the storage bin to convey the particulate material in the storage bin in the longitudinal direction to the first end of the bin;
  an unload auger assembly supported at the first end of the storage bin to extend upwardly from an inlet end to an outlet end of the unload auger assembly;
  the unload auger assembly including an unload auger tube in communication with the lower auger within the bottom end of the storage bin at the inlet end of the unload auger assembly;
  the unload auger tube being pivotal relative to the storage bin about a swing axis oriented in the longitudinal direction of the storage bin between a first position offset laterally from the lower auger to one side of the storage bin and a second position offset laterally from the lower auger to an opposing side of the storage bin;
  the unload auger assembly including an unload auger rotatably supported in the unload auger tube to convey the particulate material upwardly from the inlet end to the outlet end of the unload auger assembly;
  a gearbox supported at the inlet end of the unload auger assembly so as to be operably connected to both the lower auger and the unload auger;
  the gearbox comprising:
    an input shaft adapted to receive an input drive rotation from a drive source externally of the gearbox for rotation of the input shaft about an input axis of the input shaft;
    a main shaft having a first output portion which is directly coupled to the unload auger for rotation together about a main axis of the main shaft;
    an output shaft having a second output portion which is directly coupled to the lower auger for rotation together about an output axis of the output shaft; and
    a plurality of transfer gears operatively connected between the input shaft, the main shaft and the output shaft to transfer the input drive rotation from the input shaft to both the main shaft and the output shaft;
    the transfer gears including a pair of input transfer gears operatively connected between the input shaft and the main shaft so as to transfer the input drive rotation from the input shaft to the main shaft and a pair of output transfer gears operatively connected between the output shaft and one of input shaft or the main shaft so as to transfer the input drive rotation to the output shaft;
  wherein the output transfer gears are supported on the main shaft and the output shaft respectively so as to transfer the input drive rotation from the main shaft to the output shaft; and
  wherein the output transfer gears comprise a first output transfer gear fixed on the main shaft to rotate together and a second output transfer gear fixed on the output shaft to rotate together, the first output transfer gear being supported on the main shaft at a location offset radially from an axis about which the second one of the augers rotates in a radial direction that the first one of the augers extends away from the second one of the augers.

9. The agricultural wagon according to claim 8 wherein the input shaft is operatively connected to the main shaft at a location which is diametrically opposite from the first output transfer gear in relation to the output shaft that is coupled to the second one of the augers.

10. The agricultural wagon according to claim 8 wherein the input transfer gears comprise a first input transfer gear fixed on the input shaft to rotate together and a second input transfer gear fixed on the main shaft to rotate together in which the second input transfer gear meshes with the first input transfer gear to transfer the input drive rotation from the input shaft to the main shaft, the second input transfer gear being supported on the main shaft diametrically opposite from the first output transfer gear in relation to the output shaft that is coupled to the second one of the augers.

11. The agricultural wagon according to claim 1 wherein the first output portion of the main shaft is fixedly coupled to the unload auger for rotation together and wherein the second output portion of the output shaft is fixedly coupled to the lower auger for rotation together.

12. The agricultural wagon according to claim 1 wherein the main axis of the main shaft, the input axis of the input shaft and the output axis of the output shaft lie in a common plane.

13. An agricultural wagon for receiving particulate material therein, the agricultural wagon comprising:
  a storage bin extending in longitudinal direction between a first end and a second end of the storage bin for receiving the particulate material therein;
  wheels supporting the storage bin thereon for rolling movement along a ground surface in the longitudinal direction of the storage bin;
  a lower auger operably supported within the storage bin at a bottom end of the storage bin to convey the particulate material in the storage bin in the longitudinal direction to the first end of the bin;
  an unload auger assembly supported at the first end of the storage bin to extend upwardly from an inlet end to an outlet end of the unload auger assembly;
  the unload auger assembly including an unload auger tube in communication with the lower auger within the bottom end of the storage bin at the inlet end of the unload auger assembly;

the unload auger tube being pivotal relative to the storage bin about a swing axis oriented in the longitudinal direction of the storage bin between a first position offset laterally from the lower auger to one side of the storage bin and a second position offset laterally from the lower auger to an opposing side of the storage bin;

the unload auger assembly including an unload auger rotatably supported in the unload auger tube to convey the particulate material upwardly from the inlet end to the outlet end of the unload auger assembly;

a gearbox supported at the inlet end of the unload auger assembly so as be operably connected to both the lower auger and the unload auger;

the gearbox comprising:

an input shaft adapted to receive an input drive rotation from a drive source externally of the gearbox for rotation of the input shaft about an input axis of the input shaft;

a main shaft having a first output portion which is directly coupled to the unload auger for rotation together about a main axis of the main shaft;

an output shaft having a second output portion which is directly coupled to the lower auger for rotation together about an output axis of the output shaft; and a plurality of transfer gears operatively connected between the input shaft, the main shaft and the output shaft to transfer the input drive rotation from the input shaft to both the main shaft and the output shaft;

the transfer pears including a pair of input transfer gears operatively connected between the input shaft and the main shaft so as to transfer the input drive rotation from the input shaft to the main shaft and pair of output transfer gears operatively connected between the output shaft and one of input shaft or the main shaft so as to transfer the input drive rotation to the output shaft;

wherein the output transfer gears are supported on the input shaft and the output shaft respectively so as to transfer the input drive rotation directly from the input shaft to the output shaft.

14. The agricultural wagon according to claim 13 further comprising a shifting mechanism operatively connected to the output transfer gears such that the gears can be shifted between an engaged position in which the output shaft and the input shaft are connected by the output transfer gears for rotation together and a disengaged position in which the output shaft and the input shaft are rotatable independently of one another.

15. The agricultural wagon according to claim 13 wherein the output transfer gears comprise a first output transfer gear fixed on the input shaft to rotate together and a second output transfer gear fixed on the output shaft to rotate together, the first output transfer gear having fewer teeth than the second output transfer gear.

16. The agricultural wagon according to claim 13 wherein the input axis of the input shaft and the main axis of the main shaft lie in a common plane, and wherein the output axis of the output shaft is parallel and spaced apart from the common plane.

\* \* \* \* \*